Sept. 18, 1923.
B. W. DAVIS
1,468,286
TRAIN CONTROL SAFETY DEVICE
Filed May 2, 1922
3 Sheets-Sheet 1
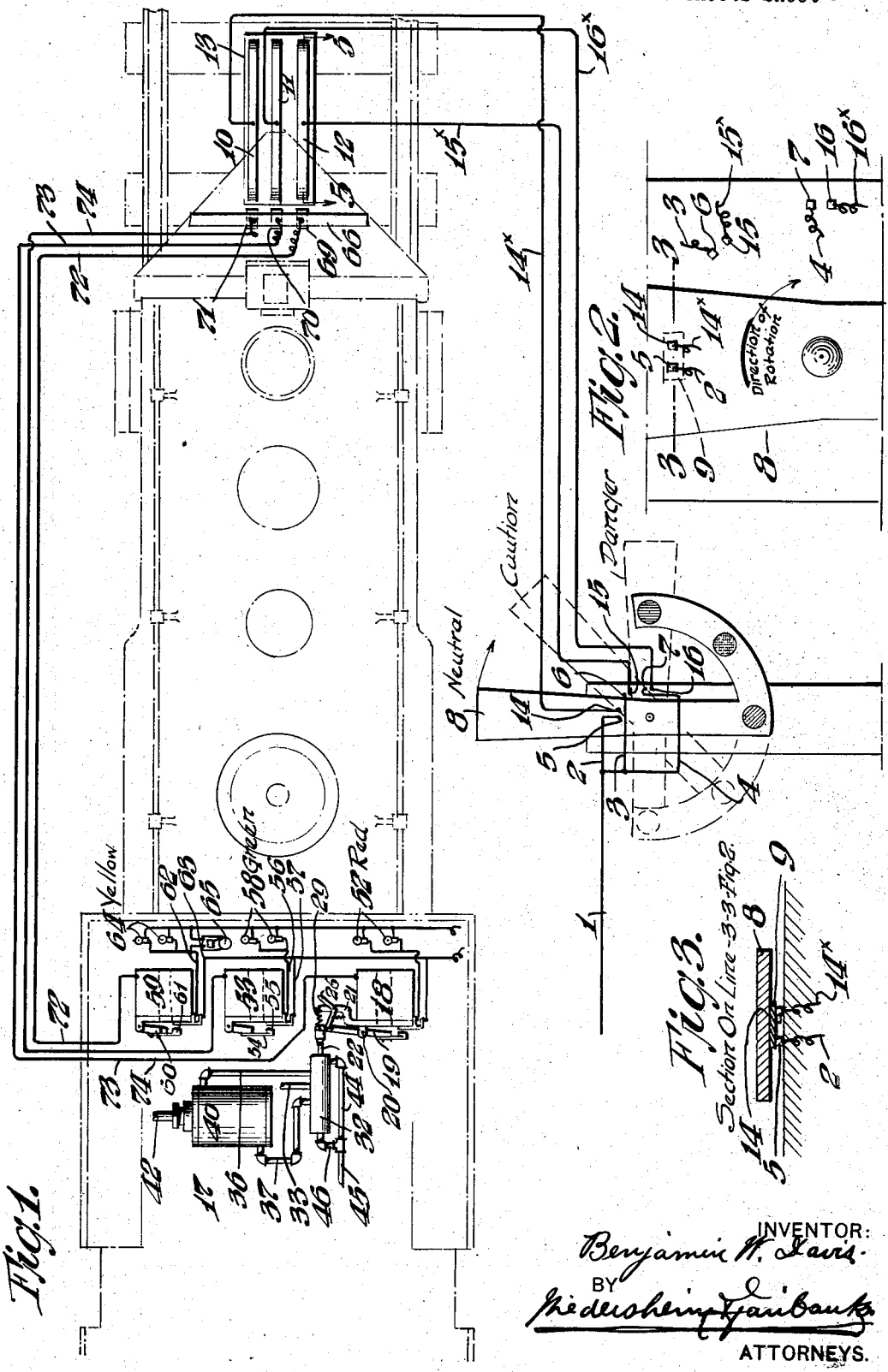
INVENTOR:
Benjamin W. Davis.
BY
ATTORNEYS.

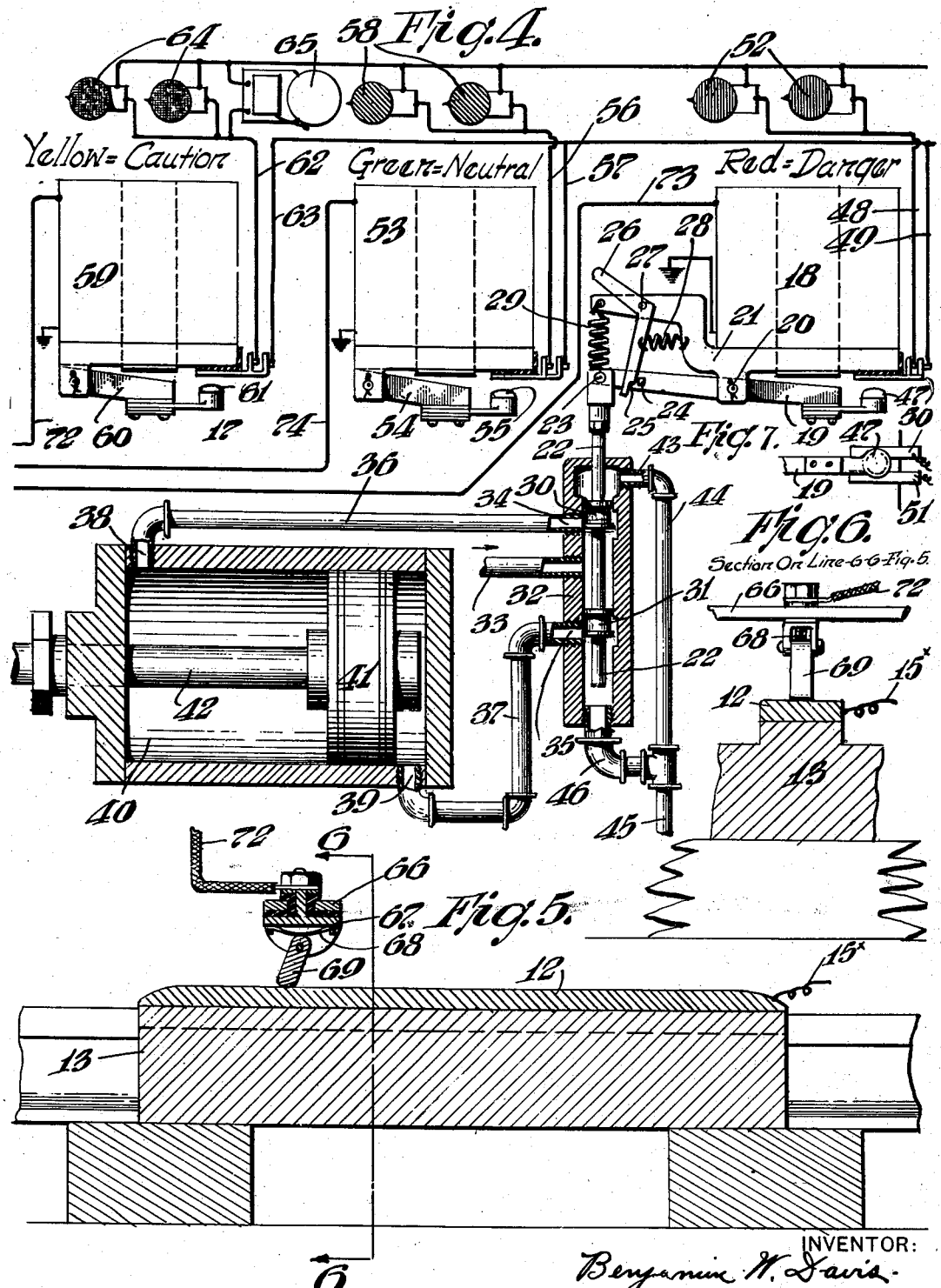

Sept. 18, 1923.

B. W. DAVIS 1,468,286

TRAIN CONTROL SAFETY DEVICE

Filed May 2, 1922    Sheets-Sheet 3

INVENTOR:
Benjamin W. Davis.
BY
ATTORNEYS.

Patented Sept. 18, 1923.

1,468,286

UNITED STATES PATENT OFFICE.

BENJAMIN W. DAVIS, OF RIDLEY PARK, PENNSYLVANIA.

TRAIN-CONTROL SAFETY DEVICE.

Application filed May 2, 1922. Serial No. 557,872.

*To all whom it may concern:*

Be it known that I, BENJAMIN W. DAVIS, a citizen of the United States, residing at Ridley Park, in the county of Delaware, State of Pennsylvania, have invented a new and useful Train-Control Safety Device, of which the following is a specification.

My invention consists of a novel construction of a train control safety device and a cab signal device, which is adapted to be carried in the cab of a locomotive, other vehicle or the like, and comprises a series of magnets electrically connected to different lights, as red, green and yellow, whose circuits are automatically closed when the vehicle reaches a predetermined distance from a semaphore, whereby the engineer, motorman or the like may be apprised in inclement, foggy or snowy weather as to the position of the semaphore when the same may be invisible to the engineer, owing to climatic conditions, one of said magnets being also adapted when energized, as hereafter explained, to effect automatically by suitable connections the actuation of the air brake mechanism to set the brake in case the semaphore arm is set at danger.

It further consists in providing novel circuit closing means carried by the engine or vehicle and adapted to contact the proper one of a plurality of contact rails located at a proper distance from the semaphore, whereby the closing of the proper circuit, as the train approaches to within a predetermined distance from the semaphore will, in case the semaphore arm is set at danger, actuate certain electrically controlled devices automatically, which will set the automatic air brake mechanism, and apply the brakes, so that in case the semaphore arm is set at danger and is invisible to the engineer owing to the climatic or other conditions, the air brakes will be automatically applied without requiring attention on the part of the engineer or motorman.

It further consists in providing a portion of the semaphore arm with contact members forming circuit opening and closing devices, functioning as said arm moves from "neutral" to the "caution" and "danger" positions, which are electrically connected to a plurality of contact rails, whereby independent electric circuits may be closed upon the approach of the engine or vehicle carrying a member coacting with said contact rails to open and close said circuits.

It further consists in utilizing a cab signal system of the character above described, in conjunction with a standard or conventional block signal system, whereby when the circuit closing devices carried by the engine are functioning in the block system, the semaphores thereof become operative.

It further consists of other novel features of construction and advantage, all as will be hereinafter fully set forth.

For the purpose of illustrating my invention, I have shown in the accompanying drawings a form thereof which is at present preferred by me, since it will give in practice satisfactory and reliable results, although it is to be understood that the various instrumentalities of which my invention consists can be variously arranged and organized and that my invention is not limited to the precise arrangement of these instrumentalities as herein shown and described.

In the accompanying drawings, Figure 1 represents a diagrammatic plan view of a wiring diagram, showing a signal control system, adapted to be located within the cab of a locomotive, or other vehicle and the electrical connections coacting therewith and with a semaphore.

Figure 2 represents an enlarged view of the semaphore or signal arm, showing the contact members thereof.

Figure 3 represents a section on line 3—3 of Figure 2.

Figure 4 represents on an enlarged scale, the cab signal system and the automatic control device connecting with the air brake mechanism.

Figure 5 represents a section on line 5—5 of Figure 1.

Figure 6 represents a section on line 6—6 of Figure 5.

Figure 7 represents a plan view of a portion of Figure 4.

Similar numerals of reference indicate corresponding parts.

Figure 8:
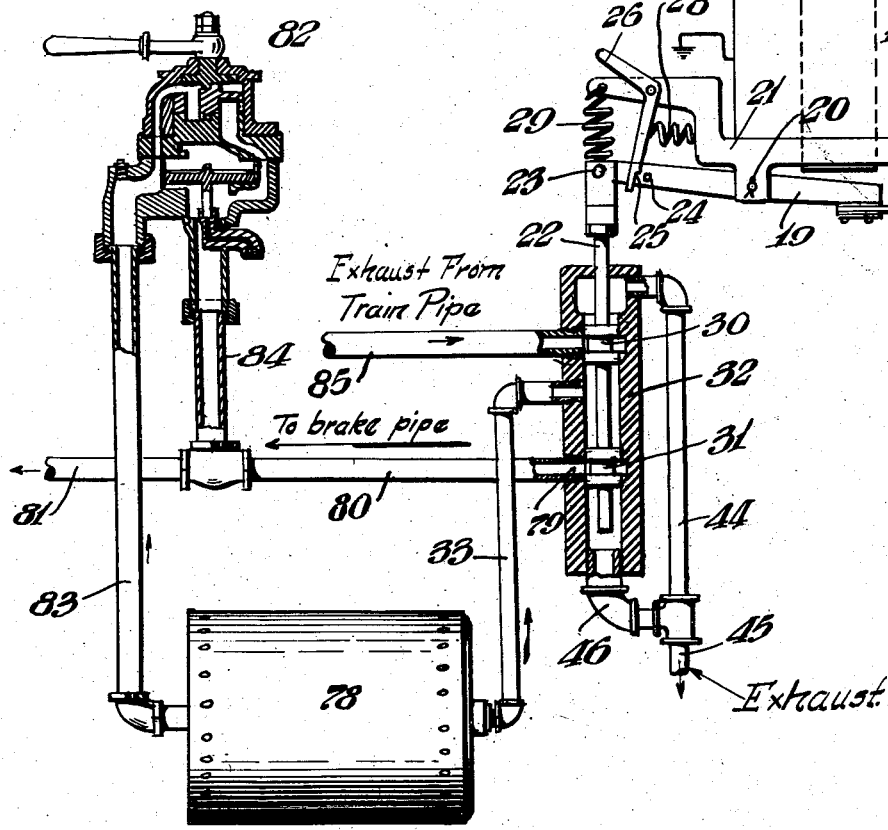
Figure 8 represents a diagrammatic view of a modification.

Referring to the drawings, 1 designates the main feed line of current, said line having the branch lead wires 2—3—4, which are connected to the contact members 5—6 and 7 respectively. 8 designates the signal arm of a semaphore, said semaphore being of any conventional type, other than that shown in Figures 1 and 2. 9 designates a contact plate on said arm, see Figure 3, the function of which will be hereinafter described. 10—11—12 represent elongated contact strips (see Figures 1 and 5) which are of conductive material, supported by the insulated blocks 13, which support said contact strips above the track rails, as seen from Figure 5.

The contact strip 10, see Figure 1, is connected to the contact member 14, by the wire 14×, the contact strip 11 is connected to the contact member 16 by the wire 16×, and the contact strip 12 is connected to the contact member 15 by the wire 15×.

17 designates a cab signal system, which is best seen at the left of Figure 1 and in Figure 4 and comprises a plurality of magnets, whose energization at the proper intervals will visually indicate to the engineer or motorman the position of the semaphore arm, and in addition, one of said magnets is connected to the air brake mechanism, in such a way that if the semaphore arm is set at danger, the brakes will be automatically applied at the proper intervals, the mode of operation of said magnets and their adjuncts being now explained.

When the core of the magnet 18 is energized, it will attract one end of the lever 19 fulcrumed at the point 20 in the bracket 21, the other end of said lever being pivoted to the valve rod 22, at the point 23. The lever 19 has the lug 24 thereon, which is adapted to be engaged by the notch 25 of the elbow lever 26 which is fulcrumed at 27 to the bracket 21, the spring 28 tending to pull the notch 25 into engagement with the lug 24 when the latter moves downwardly from the position seen in Figure 4 upon the energization of the magnet 18. The spring 29 common to the end of the bracket 21 and the end of the valve rod 22 serves to normally hold the parts in the position seen in Figure 4. The valve rod 22 carries valves 30 and 31, which are contained in the valve casing 32, which has the compressed air inlet 33, discharging into the space between said valves, which control the flow of the motive fluid from said space to the ports 34 and 35, from which lead respectively the pipes 36 and 37, which lead to ports 38 and 39 discharging into the ends of the cylinder 40, which is provided with the piston 41 and the piston rod 42, which leads to a suitable portion of the air brake mechanism, (not shown) so that when the magnet 18 is energized and the left hand end of the lever 19 has descended from the position seen in Figure 4, and the notch 25 has interlocked with the lug 24, the valve 31 will be moved below the port 35 and the motive fluid will enter the port 35, flow through the pipe 37 and the port 39 and force the piston 41 to the left of the position shown. The exhaust from the left of the piston will flow through the port 38, pipe 36, port 34, upper exhaust port 43 and pipe 44 to the main exhaust pipe 45 to the atmosphere. When the piston 41 moves into the position shown in Figure 4 it is obvious that the valve 31 will be above the port 35 and the exhaust will flow from the latter through the pipe 46 to the pipe 45.

Referring now to the upper right-hand portion of Figure 4, it will be seen that the lever 19 is provided with a circuit closing contact member or arm 47, which when the magnet 18 is energized is adapted to close the circuit composed of the wires 48 and 49 by reason of the contact of the portion 47 with the strips 50 and 51, the mode of operation being understood from Figure 7 and it being apparent that the closing of this circuit lights the red lights 52, as is evident.

It will be understood that in a similar manner, when the magnet 53 is energized, its core will attract the pivoted member 54, whereupon the contact member 55 will close the circuit composed of the wires 56 and 57, whereupon the green lights 58 will be lighted.

In like manner, when the magnet 59 is energized, the lever 60 will be attracted towards the magnet and the contact member 61 will close the circuit composed of the wires 62 and 63, thereupon lighting the yellow lights 64 and simultaneously ringing the bell 65, it being of course understood that the green lights 58 are indicative of the neutral position of the semaphore arm, the yellow lights 64 are indicative of the caution position of said semaphore arm, while the red lights 52 are indicative of the danger position of the semaphore arm.

The operation of the circuit closing mechanism for each of the magnets will be understood from Figure 7, the contact member, as 47, 55 or 61, closing against the two parallel strips as 50 and 51, in each case.

Referring now to Figures 1 and 5, 66 designates a bar carried by the locomotive or other vehicle, which latter carries a conductive member 67 suitably insulated, as will be understood from Figure 5, below which is the bowed spring 68 and below the spring is pivotally mounted the contact shoe 69, whose upper end is in contact with the bowed spring 67 and its lower end is in contact with the contact rail 12.

There are three of the contact shoes corresponding to the shoe 69 arranged in a row, as will be understood from Figure 1, the contact shoe 69 being adapted to contact with the contact strip 12, as stated, while the middle contact shoe 70 is adapted to contact with the middle strip 11 and the outer contact shoe 71 is adapted to contact with the outer strip 10. The three elongated strips 10, 11 and 12 are preferably arranged in parallelism between the rails or track at a predetermined distance from the semaphore and their upper surface is slightly elevated above the track as will be understood from Figure 5.

From the contact shoe 69 leads the wire 72 to the magnet 59, which controls the yellow or "caution" lights, while from the contact shoe 70 leads the wire 73 to the magnet 18, which controls the automatic brake operating mechanism and the red or "danger" lights, while from the contact shoe 71 leads the wire 74 to the magnet 53, which controls the green or "neutral" lights. The ground connections from the magnets 18, 53 and 59 will be understood from Figure 4, and the wiring common to the various magnets and the red, green and yellow lights respectively will be understood by those skilled in the art from the left-hand portion of Figure 1 and from Figure 4, as is evident.

It will thus be seen from the foregoing that assuming the semaphore arm to be set in its neutral position, as seen in full lines in Figure 1, the circuit will be closed by the contact plate 9 of the semaphore arm between the contact points 5 and 14 and when the shoe 71 contacts with the strip 10, the magnet 53 will be energized and the circuit of the green lights 58 will be closed and it will be visually indicated to the engineer or motorman that the semaphore arm is in neutral position and that the track or line is open and that he can proceed accordingly.

Assuming now that the semaphore arm is set in the caution position, as shown diagonally in dotted lines in Figure 1, it will be apparent that the contact points 6 and 15, see Figure 2, are closed, and by reason of the connection 15× to the contact strip 12, it will be apparent that when the shoe 69 contacts with said strip 12, it will close the circuit leading to the magnet 59, which controls the yellow or "caution" lights, whereupon the same will become illuminated and will simultaneously ring the bell 65, thereby indicating to the engineer or motorman that the semaphore arm is in its intermediate or caution position, even though said arm may be invisible to the engineer.

Assuming now that the semaphore arm 9 is set in the danger position, as indicated in dotted lines in Figure 1, it will be apparent that the contacts 7 and 16 will be closed and electrical connection will be had by means of the wire 16× to the middle contact rail 11. Consequently, when the middle shoe 70 contacts with the rail 11, through the medium of the wire 73, which leads to the magnet 18, said magnet will be energized and will close the circuit leading to red light 52, thereby instantly indicating the danger position of the semaphore arm and in addition the energizing of the magnet 18 attracting the lever 19, will cause the lug 24 to interlock with the notch 25, whereupon the valve rod 22 will move downwardly from the position seen in Figure 4, and the compressed air will be admitted through the pipe 33 into the port 35, pipe 37 and port 39 and the piston 41 will be moved to the left of the position seen in Figure 4, thereby automatically applying the brakes without requiring any attention on the part of the engineer or operator. I have deemed it unnecessary to show the connection from the piston rod 42 to the air brake mechanism as this latter may be of any conventional type, and any suitable connection may be made from the piston rod 42 thereto.

When it is desired to release the brakes, it is only necessary for the engineer manually to operate the elbow lever 26, whereupon the parts again assume the position seen in Figure 4.

It will thus be seen from the foregoing that I have made provision for enabling the engineer or motorman to be instantly apprised of the position of the semaphore arm in any one of its three positions, in case the same should be invisible by reason of fog, snow or inclement weather, and I further make provision in case the semaphore arm is set at danger for the air brake system to automatically become operative without requiring any attention on the part of the engineer or motorman.

Referring now to Figure 8, I have shown a modification of a portion of the structure seen in Figure 4, wherein I may if desired dispense with the pipes 36, 37, the cylinder 40, the piston 41 and the piston 42 seen in said figure. The magnet 18, its lever 19, elbow lever 26, springs 28 and 29, valve rod 22 and valves 30 and 31 are constructed and assembled substantially as already described with respect to Figure 4.

In Figure 8, however, I have shown a preferred connection to certain portions of the air brake mechanism, which will be apparent to those skilled in the art, 78 designating the high pressure reservoir for the air brake mechanism, from which the pipe 33 which corresponds to the pipe 33 seen in Figure 4, leads to convey the compressed air to the space in the valve casing between the balanced valves 30 and 31.

When the magnet 18 is energized and the lever 19 is attracted to the core thereof, it will be apparent that the piston rod 22 will descend and the compressed air will flow through the port 79 into the pipe 80 and thence into the pipe 81 of the air brake mechanism, which conveys air to the brake line direct, whereupon it will be seen that when the magnet 18 seen in Figure 4 is energized by reason of the connections therefrom to the valvular mechanism, the compressed air will be instantly admitted to the brake line. The apparatus seen in Figure 8 is manually reset by the engineer or motorman manually operating the elbow lever 26, as has been already described with reference to Figure 4.

In Figure 8, 82 designates the engineer's brake valve, 83 the pipe leading from the reservoir 78 thereto and 84, the pipe leading from the valve 82, the exhaust passing through the pipe 85 certain of said parts being of the conventional type and require no further description, it being apparent that my device can be readily connected to the air brake systems now in vogue or use. The portion of the air brake mechanism shown in Figure 8 is a reproduction of educational chart No. 5 supplement to Locomotive Engineering April 1896, to which reference may be had for a full disclosure of the air brake mechanism.

The magnets 53 and 59 which control the green and yellow light circuits respectively are time magnets and at the time at which they are energized, the contact will be held for a period of one to six seconds in order to enable the engineer to have an opportunity of seeing said lights before the circuit is broken.

The magnet 18 has the interlocking mechanism described which will remain closed until it is disengaged by the manually operation of the lever 26.

It will be understood that the various electrical connections which have not been particularly referred to are all properly insulated, as is customary in these devices, so that no short-circuiting is liable to occur, and I have deemed it unnecessary to describe the various insulations in detail as they will be apparent to those skilled in this art.

Having thus described my invention, what I claim as new and desire to secure by Letters Patent, is:—

1. The combination of a movable vehicle, a semaphore arm having a contact plate thereon, a plurality of contact points adapted to coact with said contact plate, a plurality of contact strips connected to the contact points, a plurality of contact shoes adapted to be mounted on the vehicle to engage said strips, magnets mounted on the vehicle and independently connected to said shoes, an air brake system including a balanced valve for controlling operation of the system and connected to one of said magnets for operation thereby, a plurality of visual signals one for each magnet connected thereto, and a source of current grounded through the vehicle and through the semaphore arm for selectively energizing the magnets according to the position of the semaphore arm and connected by the visual signals to actuate the same according to the positions of the semaphore arm and to actuate the brake mechanisms when a predetermined position of the semaphore arm is reached.

2. The combination of a vehicle, a semaphore arm having a contact plate thereon, a plurality of contact points adapted to coact with said contact plate, a plurality of stationary contact strips positioned at a predetermined distance from said arm, wires leading from each of said contact strips to said contact points, a plurality of contact shoes carried by said vehicle, a plurality of magnets carried by said vehicle and adapted to be energized by the contact of said shoes with said contact strips, an air brake system, a balanced valve controlling the flow of motive fluid to said air brake system, connections from one of said magnets, whereby said valve is operated when said magnet is energized, and electric lights electrically connected with all of said magnets and adapted to indicate the neutral, caution and danger position of the semaphore arm, when the vehicle reaches a predetermined distance therefrom.

3. In a cab or other vehicle signal system, a series of electric lights carried by the vehicle and adapted to be indicative of the neutral, caution and danger position of a semaphore arm, magnets carried in the cab of said vehicle, circuit closing devices carried by the vehicle and adapted to energize a desired magnet at a predetermined distance from said semaphore arm to indicate the position of the latter, electrical connections common to each magnet and its electric light, circuit closing devices actuated upon the energizing of the proper magnet to close the corresponding electric light circuit to light the proper light to indicate the position of the semaphore arm, a lever actuated by the energizing of one of said magnets, locking devices for said lever, a balanced valve, actuated by said lever, a compressed air inlet to said valve and a pipe controlled by and leading from said valve to an air brake mechanism, for operating the latter to set the brakes when said lever is operated.

4. In a cab or other vehicle signal system, a vehicle, a magnet carried by the vehicle, a semaphore arm, means for automatically energizing said magnet when said arm is set at "danger," a lever pivotally supported upon said magnet and operated when said magnet is energized, a valve casing, a balanced valve therein, a valve rod for said valve, a pivotal connection between said lever and valve rod, a lug on said lever, a locking lever having a notch therein adapted to interlock with said lug, a spring exerting tension on said locking lever, another spring exerting tension on said valve rod, and a compressed air inlet and outlet for said valve casing controlled by said valve, said outlet leading to the brake line of an air brake mechanism, whereby the brakes are applied when said magnet is energized.

5. In a cab or other vehicle signal system, a vehicle, a magnet carried by the vehicle, a semaphore arm, means for automatically energizing said magnet when said arm is set at "danger", a lever pivotally supported upon said magnet and operated when said magnet is energized, a valve casing, a balanced valve therein, a valve rod for said valve, a pivotal connection between said lever and valve rod, a lug on said lever, a locking lever having a notch therein adapted to interlock with said lug, a spring exerting tension on said valve rod, and a compressed air inlet and outlet for said valve casing controlled by said valve, said outlet leading to the brake line of an air brake mechanism, whereby the brakes are applied when said magnet is energized, in combination with other magnets carried by said vehicle and connected to electric lights also on said vehicle indicative of the "neutral" and "caution" portion of said semaphore arm, and means for energizing each of said magnets and illuminating its respective lights, when said semaphore arm is set at its "neutral" and "caution" position respectively.

BENJAMIN W. DAVIS.

Witnesses:
J. J. DOWNHAM,
M. D. S. STILES.